June 5, 1956 C. E. WAVELL 2,749,429

ILLUMINATED ROOF FOR OUTDOOR PHONE BOOTHS

Filed July 31, 1953

Inventor:
Clifford E. Wavell.
By Fulwider, Mattingly & Babcock.
Att'ys.

2,749,429
Patented June 5, 1956

2,749,429

ILLUMINATED ROOF FOR OUTDOOR PHONE BOOTHS

Clifford E. Wavell, Long Beach, Calif.

Application July 31, 1953, Serial No. 371,465
6 Claims. (Cl. 240—2)

The present invention relates generally to the field of outdoor telephone booths, but more particularly to a combined roof structure and illuminated signal that may be incorporated in both new and old telephone booths to indicate their location to the public after dark.

The use of outdoor telephone booths in such locations as service stations, parking lots, amusement areas, parks and the like, is a development that increases in scope each year. Telephone booths so located provide the public with means for quick and easy communication, without in any way bothering or distracting the personnal in charge of the area in which the booth is located.

From experience it has been found that owners or operators of areas in which outdoor phone booths are located do not consider that such structures add to the appearance or ornamentality of the property, and as a consequence, either paint them a color that blends with that of other structures on the property, or position them in out-of-the-way inconspicuous locations.

Although an outdoor telephone booth that is so colored or located may be found with little difficulty during the day time, it is virtually impossible to find such a booth after dark, unless the person desiring to use a phone is familiar with the geographical area in which the booth is situated.

The primary purpose in devising the present invention is to provide an illuminated signal of distinctive color that may be incorporated into either the structure of a new or presently existing outdoor telephone booth to indicate its location after dark.

A major object of the present invention is to supply a portable unit that may be pivotally mounted in the upper portion of an outdoor telephone booth, with the unit when so mounted serving both as a waterproof roof for the booth, as well as a signaling device to indicate the position of the booth after dark.

Another object of the invention is to provide a combined roof structure and signaling device for an outdoor telephone booth that has an attractive ornamental appearance, may be fabricated from standard commercially available materials, and may be installed on or removed from a telephone booth with a minimum of time and effort.

A further object of the invention is to supply a signaling device that is not only automatically illuminated after night-fall, but one that due to the distinctive color thereof is easily visible during the day time.

Yet another object of the invention is to furnish a signaling device that is of rugged construction, requires a minimum of maintenance attention, and has a relatively low operating cost.

A still further object of the invention is to furnish a device to replace the roof structure of a presently existing outdoor telephone booth, and when so installed not only serving as a roof but an illuminated signal that indicates the location of the booth after dark.

These and other objects and advantages of the invention will become apparent from the following description of a preferred form thereof, and from the drawing illustrating that form in which.

Figures 1, 2, 3, 4, 5:
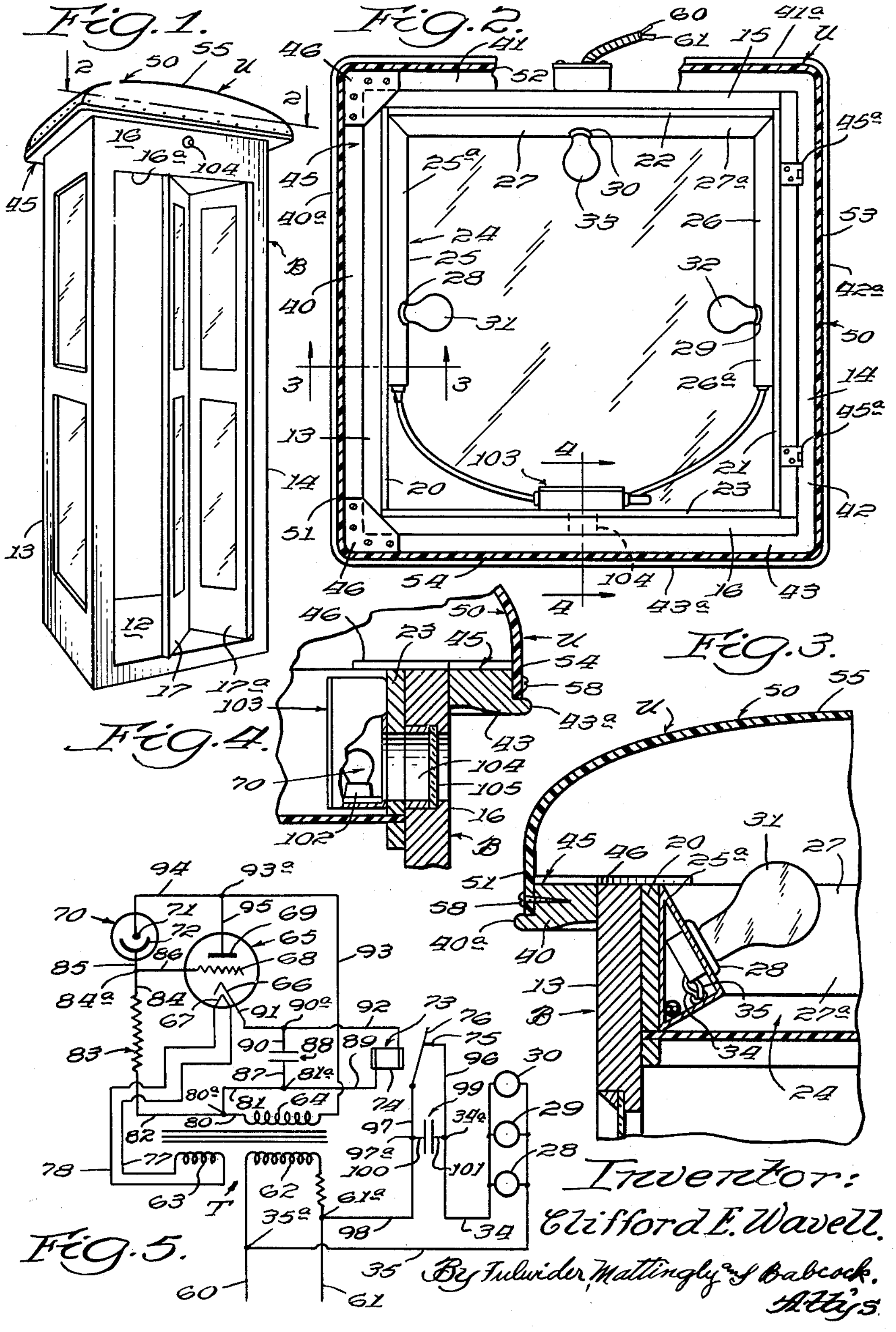
Figure 1 is a perspective view of an outdoor telephone booth equipped with the combined roof structure and signaling unit.
Figure 2 is a horizontal cross-sectional view of the unit taken on the line 2—2 of Figure 1.
Figure 3 is a fragmentary vertical cross-sectional view of the unit taken on the line 3—3 of Figure 2.
Figure 4 is a fragmentary vertical cross-sectional view of the housing portion of the unit in which the light sensitive electronic tube is disposed.
Figure 5 is a diagram of the electronic circuit employed with the unit.

Referring now to the drawing for the general arrangement of the invention, it will be seen in Figure 1 that a combination roof and signaling unit is mounted on the top portion of an outdoor telephone booth B, and the unit U is connected by insulated conductors to a source of domestic electrical energy (not shown).

The telephone booth B is formed with a substantially square or rectangular base 12 from which two elongated side walls 13 and 14, and a back wall 15 extend upwardly. A front wall 16 is provided and has a rectangular doorway **16*a* formed therein. Two door panels 17 and 17*a* are hinged together which are adapted to be brought into a single vertical plane to completely close doorway 16*a* when desired. Panel 17*a* is pivotally supported from one of the vertical edge portions of doorway 16*a***, as common in telephone booth construction.

In Figures 2 and 3 it will be seen that four strips 20, 21, 22, 23 of wood or a like rigid material are affixed to the upper interior surfaces of the side walls 13 and 14, back wall 15, and front wall 16 respectively. The end portions of strips 20, 21, 22, and 23 abut against one another to form a square or rectangular frame. A hollow member 24 of triangular vertical cross section is affixed to members 20, 21, and 22. Member 24 is of U-shaped configuration in plan, and has two laterally spaced parallel legs 25 and 26 that are joined by a third leg 27. Leg 25 is disposed adjacent the interior surface of strip 20.

Legs 25, 26 and 27 each have a downwardly and inwardly extending wall **25*a*, 26*a*, 27*a* respectively, as may best be seen in Figure 3. Each wall 25*a*, 26*a*, and 27*a* is formed with a circular opening of such diameter as to receive an incandescent bulb-holding socket 28, 29, and 30, respectively. Sockets 28, 29, and 30 support incandescent bulbs 31, 32, and 33 respectively. Electrical energy is supplied to sockets 28, 29 and 30 by means of two insulated electrical conductors 34 and 35 disposed within the confines of member 24**.

The combination roof structure and signaling unit U of the invention includes four elongate rigid members 40, 41, 42 and 43 of substantially rectangular cross section that are joined at their end portions to form a rigid rectangular frame 45. The frame 45 is preferably provided with two hinges **45*a* affixed to the top portion of side wall 14 to permit downward movement of the frame over the exterior surfaces of the walls 13—16** of booth B, as may best be seen in Figure 3.

In Figure 2 it will be seen that two plates 46 of a generally triangular shape are provided. Each of the plates is affixed by screws or other conventional fastening means to the upper surface of frame 45 at the corners thereof adjacent side walls 13. The plates 46 limit the pivotal downward movement of frame 45 over the walls 13—16 as may best be seen in Figure 3.

The members 40—43 have longitudinally extending lips **40*a*, 41*a*, 42*a*, 43*a* respectively, formed on the lower portions of the outwardly disposed vertical faces thereof. A dome 50** is provided that is preferably formed from fibre glass or other tough translucent material that is water-proof. Dome 50 is a part of signaling unit U. In shape, the dome 50 includes four vertically disposed side walls 51, 52, 53, 54 that are joined to one another at their ends to form an integral rectangular frame. The interior dimensions of the dome frame are such that the interior surfaces of the side walls 51—54 snugly engage and slide downwardly over the outer vertical surfaces of the members 40—43 respectively. The lower edges of dome side walls 51—54 seat on the upper surfaces of lips 40a—43a respectively.

A plurality of screws 58 extend through the dome side walls 51—54 into members 40—43 to hold them and dome 50 together in an integral weather-tight unit. In Figure 3 it will be seen that the dome side walls 51—54 develop on their upper edge portions into a common upwardly and inwardly extending dome surface 55 of convex vertical cross section. The dome 50 is illuminated at night, as well as when the light intensity in the area in which booth B is situated drops below a predetermined level, such as may occur on a cloudy or foggy day, by incandescent bulbs 31, 32, and 33.

From the standpoint of the unit U signaling the location of the booth B, it is of the utmost importance that dome 50 be of a distinctive color that stands out when illuminated. It is also highly important that the color of the dome be one that is permanent, and will not fade or discolor due to the action of the sun and weather. For these reasons it is desirable to have the pigment that provides the dome coloration embodied as an integral part of the sheet material from which the dome is fabricated. In practice, it has been found that a dome 50 of yellow coloration provides a most satisfactory signal light.

The electrical means used to automatically complete an electrical circuit to the incandescent bulbs 31, 32 and 33 after night-fall is shown in diagrammatic form in Figure 5. Said electrical means maintains a completed circuit to bulbs 31—33 so long as it is dark, but breaks said circuit at daybreak when illumination of the dome 50 is no longer required to disclose the location of the phone booth in which it is installed.

In Figures 2 and 5 it will be seen that two insulated electrical conductors 60 and 61 extend from a source of domestic electrical power (not shown) to a primary 62 of a transformer T. The transformer T includes two secondaries 63 and 64. Secondary 63 supplies low voltage electrical energy, while secondary 64 furnishes electrical power at a considerably higher voltage. Transformer T is preferably located on the upper portion of back wall 15.

The electrical circuit shown in Figure 5 includes a three-element vacuum tube 65, such as the 6–J–5 type. Tube 65 includes a cathode 66, cathode heater 67, grid 68 and anode plate 69. A photocell tube 70 is also provided that is of the 929 type. Tube 70 has an anode 71 and light sensitive cathode 72. The circuit also includes a sensitive relay 73 that has a coil 74, contact 75 and armature 76.

Cathode heater 67 is connected by two electrical conductors 77, 78 to secondary 63. A conductor 80 extends from secondary 64 to a junction point 80a from which junction point two conductors 81 and 82 extend. Conductor 82 is connected to one terminal of a resistor 83, with the other terminal of the resistor having a conductor 84 extending therefrom to a junction point 84a. Conductors 85 and 86 are connected to junction point 84a. Conductor 85 is connected to photocell cathode 72, and conductor 86 extends to grid 68 in tube 65.

Conductor 81 extends to a junction point 81a from which a conductor 87 continues to one plate of a condenser 88. Junction point 81a is connected by a conductor 89 to relay coil 74. A conductor 90 extends from condenser 88 to junction point 90a. The junction point 90a is connected by a conductor 91 to cathode 66, and by a conductor 92 to relay coil 74. Transformer secondary 64 is connected by a conductor 93 to a junction point 93a. A conductor 94 extends from junction point 93a to a photocell anode 71. A second conductor 95 extends from junction point 93a to anode plate 69 in tube 65.

The conductors 34 and 35 that supply electrical energy to sockets 28, 29 and 30 are connected to the above described circuit at junction points 34a and 35a respectively. An electrical conductor 96 connects junction points 34a and relay contact 75. Relay armature 76 is connected by a conductor 97 to junction point 97a. A conductor 98 extends from junction point 97a to junction point 61a. A condenser 99 has the plates thereof connected by two conductors 100 and 101 to junction points 97a and 34a respectively.

In Figure 4 it will be seen that the photocell bulb 70 is held in a suitable socket 102 that is disposed in a light tight sheet metal housing 103. The housing may be affixed in any convenient manner to the frame 45. Aligned openings are formed in the housing 102, member 43, and front wall 16 to form a light tunnel 104 that is closed by a vertically disposed piece of glass 105 or other transparent material.

The light tunnel 104 is horizontally disposed to prevent light from billboards, street lights, buildings, influencing the operation of the invention. Although the light tunnel 104 is shown as located in the upper portion of front wall 16 of the phone booth, it will be apparent that it may be relocated on the back wall or side walls thereof in the event it is exposed to a source of artificial light that would prevent normal operation of the invention.

The use of the invention is extremely simple. The booth is simply disposed in the desired position in a given area, and the electrical conductors 60 and 61 connected to a source of domestic electrical energy (not shown).

Relay 73 unless the coil 74 thereof is electrically energized, normally remains in the closed position as shown in Figure 5, and permits electrical energy to flow from conductors 60, 61 to the bulb holding sockets 28, 29, and 30. Thus, the incandescent bulbs 31, 32 and 33 are illuminated, and the light emitted therefrom causes the dome 50 to glow brightly with a particularl color to signal the location of the booth B. Dome 50 may of course be fabricated from a variety of waterproof colored materials. However, in experiments it has been found that fibre glass carrying a yellow pigmentation is a most satisfactory material with which to fabicate dome 50, as this material when illuminated from the interior provides a distinctive and easily visible signal.

After the device has operated throughout the night, the signal is automatically shut off shortly after daybreak when the light intensity is sufficiently strong to activate photocell tube 70. When light shines on the cathode 72, the tube 70 conducts electricity that flows through resistor 83. Flow of current through resistor 83 causes a voltage drop, which voltage drop positively biases the grid 68 to the extent that tube 65 becomes electrically conductive.

As tube 65 becomes electrically conductive, an electrical circuit is completed to relay coil 74 from primary 64 through a first leg that includes conductor 80, junction point 80a, conductor 81, junction point 81a, conductor 89 and a second leg comprising conductor 93, junction point 93a, conductor 95, tube 65, conductor 91, junction point 90a, and conductor 92. Energization of relay coil 74 causes armature 76 to move out of engagement with contact 75, and the electrical circuit to bulb-holding sockets 28, 29, and 30 is broken until such time as tube 70 ceases conducting an electrical current.

The photocell tube 70 will only stop conducting an electrical current after light ceases to shine on cathode 72, which of course, occurs at nightfall. At this time the tube 70 ceases to conduct an electrical current, and the positive bias on tube 65 is reduced to the extent that this tube no longer conducts an electrical current. The relay coil 74 is now de-energized, and the armature 76 moves to its normally closed position in engagement with contact 75. An electrical circuit is then reestablished to the bulb holding sockets 28, 29 and 30 to cause illumination of dome 50. It should be noted that in addition to illuminating the dome, bulbs 31, 32 and 33 also illuminate the interior of the booth.

The necessity of maintenance work on the unit U is immediately signaled by the dome 50 remaining illuminated during the daytime. The reason for such illumination is that the relay 73 is of the normally closed type.

Upon it being desired to inspect the circuit or replace tubes 65 or 70, or bulbs 31, 32, 33, the dome is pivoted upwardly on hinges 45*a* to a position where the maintenance work may be conveniently carried out.

Although the combined roof structure and illuminated signal for an outdoor telephone booth above described is fully capable of performing the objects and providing the advantages hereinbefore mentioned, it is to be understood that it is merely the presently preferred embodiment of the invention, and is not to be limited to the details of construciton herein shown and described other than as defined in the appended claims.

I claim:

1. A combination roof and illuminated signal for an outdoor telephone booth comprising a base and four vertically disposed walls which includes: a rigid rectangular frame of such size as to movably engage the extreme upper exterior surfaces of said walls; hinge means pivotally connecting said frame to the upper extremity of one of said walls; a dome formed of a colored translucent waterproof sheet material affixed to and extending upwardly from said frame; electrically operated illuminating means that cause said dome to glow with a colored light to indicate the location of said booth; an electrical circuit for supplying electrical power to actuate said illuminating means; a normally closed relay which when in a non-energized condition completes a portion of said circuit to actuate said illuminating means; a vacuum tube in said circuit which when electrically conductive causes energization of said relay; a photo-electric cell in said circuit, which cell becomes electrically conductive when exposed to light of a predetermined intensity to induce electrical conduction in said vacuum tube, whereupon said relay becomes energized; a light-tight housing wherein said photo-electric cell is disposed; and a light tunnel in communication with the interior of said housing and outside of said booth to permit response of said photo-electric cell to exterior light conditions.

2. A combination roof and illuminated signal for an outdoor telephone booth comprising a base and four vertically disposed walls which includes: a rigid rectangular frame formed of four members securely joined together at their ends, with each member being formed with a longitudinally extending lip on the outwardly disposed vertical face thereof; a dome formed of a colored translucent water-proof sheet material having four substantially vertical side walls which snugly engage said outwardly disposed vertical faces of said members, with the lower edges of said side walls abutting against said lips; means engaging said members and dome side walls to hold said dome and frame together as an integral unit; hinge means pivotally connecting one of said frame members to the upper extremity of one of said side walls; stop means supporting said frame in a substantially horizontal position on the top of said booth; electrically operated illuminating means that cause said dome to glow with a colored light to indicate the location of said booth; an electrical circuit for supplying power to actuate said illuminating means; a normally closed relay which when in a non-energized condition completes a portion of said circuit to actuate said illuminating means; a vacuum tube in said circuit which when electrically conductive causes energization of said relay; a photo-electric cell in said circuit, which cell becomes electrically conductive when exposed to light of a predetermined intensity to induce electrical conduction in said vacuum tube, whereupon said relay becomes energized; a light-tight housing wherein said photo-electric cell is disposed; and a light tunnel in communication with the interior of said housing and outside of said booth to permit response of said photo-electric cell to exterior light conditions.

3. A combination roof and illuminated signal for an outdoor telephone booth comprising a base and four vertically disposed walls which includes: a rigid rectangular frame formed of four members securely joined together at their ends, with each member being formed with a longitudinally extending flange on the outwardly disposed vertical face thereof; a dome formed of a colored translucent waterproof sheet material having four substantially vertical side walls which snugly engage said outwardly disposed vertical faces of said members, with the lower edges of said side walls abutting against said flanges; means engaging said members and dome side walls to hold said dome and frame together as an integral unit; hinge means pivotally connecting one of said frame members to the upper extremity of one of said side walls; stop means supporting said frame in a substantially horizontal position on the top of said booth; electrically operated illuminating means that cause said dome to glow with a colored light to indicate the location of said booth; an electrical circuit for supplying power to actuate said illuminating means; and light responsive means in said circuit and controlling the operation thereof, which means completes said circuit to said illuminating means when the light intensity surrounding said booth drops below a predetermined degree, and breaks said circuit to said illuminating means when said light intensity rises above said predetermined degree.

4. A roof structure that may be illuminated to indicate the position of the outdoor telephone booth on which it is mounted which includes: a rigid rectangular frame formed of four members securely joined together at their ends, with each member being formed with a longitudinally extending lip on the outwardly disposed vertical face thereof; a dome formed of a colored translucent waterproof sheet material having four substantially vertical side walls which snugly engage said outwardly disposed vertical faces of said members, with the lower edges of said side walls abutting against said lips; means engaging said members and dome side walls to hold said dome and frame together as an integral unit; means for mounting said unit on the upper open end of an outdoor telephone booth; electrically operated illuminating means that cause said dome to glow with a colored light to indicate the location of said booth; an electrical circuit for supplying electrical power to actuate said illuminating means; a normally closed relay which when in a non-energized condition completes a portion of said circuit to actuate said illuminating means; a vacuum tube in said circuit which when electrically conductive causes energization of said relay; a photo-electric cell in said circuit, which cell becomes electrically conductive when exposed to light of a predetermined intensity to induce electrical condition in said vacuum tube, whereupon said relay becomes energized; a light-tight housing wherein said photo-electric cell is disposed; and a light tunnel in communication with the interior of said housing and outside of said booth to permit response of said photo-electric cell to exterior light conditions.

5. A roof structure that may be illuminated to indicate the position of the outdoor telephone booth on which it is mounted which includes: a rigid rectangular frame formed of four members securely joined together at their ends, with each member being formed with a longitudinally extending lip on the outwardly disposed vertical face thereof; a dome formed of a colored translucent waterproof sheet material having four substantially vertical side walls which snugly engage said outwardly disposed vertical faces of said members, with the lower edges of said side walls abutting against said lips; means engaging said members and dome side walls to hold said dome and frame together as an integral unit; means for mounting said unit on the upper open end of an outdoor telephone booth; electrically operated illuminating means that cause said dome to glow with a colored light to indicate the location of said booth; an electrical circuit for supplying power to said illuminating means; and light responsive means in said circuit and controlling the operation thereof, which means completes said circuit to said illuminating means when the light intensity surrounding said booth drops below a predetermined degree, and breaks said circuit to said illuminating means when said light intensity rises above said predetermined degree.

6. A roof structure that may be illuminated to indicate the position of the outdoor telephone booth on which it is mounted which includes: a rigid rectangular frame formed of four members securely joined together at their ends, with each member being formed with a longitudinally extending lip on the outwardly disposed vertical face thereof; a dome formed of a colored translucent water-proof sheet material having four substantially vertical side walls which snugly engage said outwardly disposed vertical faces of said members, with the lower edges of said side walls abutting against said lips; means engaging said members and dome side walls to hold said dome and frame together as an integral unit; means for mounting said unit on the upper open end of an outdoor telephone booth; electrically operated illuminating means that cause said dome to glow with a colored light to indicate the location of said booth; an electrical circuit for supplying power to said illuminating means; and means to maintain said circuit in a completed condition only during such period of time as the illumination of said dome is necessary to indicate the position of said booth.

References Cited in the file of this patent

UNITED STATES PATENTS

| | | |
|---|---|---|
| 359,747 | Tabony | Mar. 22, 1887 |
| 2,176,980 | Sherron | Oct. 24, 1939 |
| 2,199,394 | Dewan | May 7, 1940 |
| 2,489,076 | Bjontegaard | Nov. 22, 1949 |
| 2,703,060 | Kiefer | Mar. 1, 1955 |

FOREIGN PATENTS

| | | |
|---|---|---|
| 786,754 | France | June 17, 1935 |